United States Patent
Xiong et al.

(10) Patent No.: US 10,203,561 B2
(45) Date of Patent: Feb. 12, 2019

(54) DISPLAY SUBSTRATE, LIQUID CRYSTAL PANEL, DISPLAY DEVICE AND MANUFACTURING METHOD OF DISPLAY SUBSTRATE

(71) Applicants: BOE Technology Group Co., Ltd., Beijing (CN); Chongqing BOE Optoelectronics Technology Co., Ltd., Chongqing (CN)

(72) Inventors: Xing Xiong, Beijing (CN); Ruilin Bi, Beijing (CN); Qiang Xiong, Beijing (CN); Hongyu Sun, Beijing (CN); Min Li, Beijing (CN); Hongjiang Wu, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 15/521,070

(22) PCT Filed: Jul. 11, 2016

(86) PCT No.: PCT/CN2016/089603
§ 371 (c)(1),
(2) Date: Apr. 21, 2017

(87) PCT Pub. No.: WO2017/148065
PCT Pub. Date: Sep. 8, 2017

(65) Prior Publication Data
US 2018/0088385 A1    Mar. 29, 2018

(30) Foreign Application Priority Data

Mar. 2, 2016 (CN) .......................... 2016 1 0118365

(51) Int. Cl.
*G02F 1/1333* (2006.01)
*G02F 1/1339* (2006.01)
(Continued)

(52) U.S. Cl.
CPC .... *G02F 1/13394* (2013.01); *G02F 1/133516* (2013.01); *G02F 1/136209* (2013.01)

(58) Field of Classification Search
CPC ............... G02F 1/1335; G02F 1/13394; G02F 1/133512; G02F 1/133514; G02F 1/1339;
(Continued)

(56) References Cited

U.S. PATENT DOCUMENTS 6,757,032 B1 * 6/2004 Zhang ............... G02F 1/133553
349/113
7,557,893 B2 * 7/2009 Kim ....................... G02B 5/201
349/106
(Continued)

FOREIGN PATENT DOCUMENTS

| CN | 101303522 A | 11/2008 |
| CN | 101770108 A | 7/2010 |

(Continued)

OTHER PUBLICATIONS

Third Office Action from Chinese Patent Application No. 201610118365.3, dated Dec. 19, 2017, 12 pages.
(Continued)

*Primary Examiner* — Thoi Duong
(74) *Attorney, Agent, or Firm* — Westman, Champlin & Koehler, P.A.

(57) ABSTRACT

The present disclosure provides a display substrate, a liquid crystal panel, a display device and a manufacturing method of a display substrate. The display substrate includes a plurality of pixel regions and grooves between adjacent pixel regions. The display substrate further includes a spacer
(Continued)

layer including a filler filled into the grooves and a supporting part protruding from the filler. The filler includes a filler grid.

16 Claims, 2 Drawing Sheets

(51) Int. Cl.
*G02F 1/1335* (2006.01)
*G02F 1/1362* (2006.01)

(58) Field of Classification Search
CPC ......... G02F 1/133345; G02F 1/136209; G02F 1/1333; G02F 2001/13398; G02F 2001/13396; G02F 2001/136222; G02F 2001/133357; G02F 2201/52; H01L 27/3246; H01L 27/3211; H01L 27/3213; H01L 27/3216; G09G 2300/0452
USPC .................. 349/106, 110, 138, 155, 156
See application file for complete search history.

(56) References Cited

U.S. PATENT DOCUMENTS

2008/0079875 A1* 4/2008 Oh .................. B29D 11/00634
349/108
2012/0281170 A1 11/2012 Wu et al.

FOREIGN PATENT DOCUMENTS

| CN | 102628971 A | 8/2012 |
| CN | 105572960 A | 5/2016 |
| JP | 2007-327985 A | 12/2007 |

OTHER PUBLICATIONS

Second Office Action from Chinese Patent Application No. 201610118365.3, dated Jun. 28, 2017, 10 pages.
International Search Report and Written Opinion, including English translation of Box No. V of the Written Opinion, for International Application No. PCT/CN2016/089603, dated Nov. 25, 2016, 14 pages.
First Office Action, including Search Report, for Chinese Patent Application No. 201610118365.3, dated Jan. 11, 2017, 9 pages.

* cited by examiner

DISPLAY SUBSTRATE, LIQUID CRYSTAL PANEL, DISPLAY DEVICE AND MANUFACTURING METHOD OF DISPLAY SUBSTRATE

CROSS-REFERENCE TO RELATED APPLICATION

This application is a Section 371 National Stage Application of International Application No. PCT/CN2016/089603, filed on Jul. 11, 2016, entitled "DISPLAY SUBSTRATE, LIQUID CRYSTAL PANEL, DISPLAY DEVICE AND MANUFACTURING METHOD OF DISPLAY SUBSTRATE", which has not yet published, which claims priority to Chinese Application No. 201610118365.3, filed on Mar. 2, 2016, incorporated herein by reference in their entirety.

BACKGROUND OF THE DISCLOSURE

Field of the Disclosure

The present disclosure relates to a technical field of display, more particularly, to a display substrate, a liquid crystal panel, a display device and a manufacturing method of a display substrate.

Description of the Related Art

Among flat panel display devices, a thin film transistor liquid crystal display (abbreviated as TFT-LCD) is characterized by small volume, low power consumption, relatively low manufacturing cost and no radiation, and has thus occupied a leading position in the current flat panel display market.

A liquid crystal panel of the TFT-LCD mainly structurally comprises an array substrate, a color filter substrate which is to be assembled with the array substrate, and a liquid crystal layer filled between the array substrate and the color filter substrate. Moreover, spacers are provided on a side of the color filter substrate close to the liquid crystal layer in order to keep the thickness of the liquid crystal layer to be uniform.

In a case that no planarization layer is provided, a significant groove is formed between adjacent pixel regions of the color filter substrate, and differences in height at four corners of color filter units increase the depth of the groove, so that an image-retention is presented in a display image of the display device, resulting in a poor display quality. Moreover, the spacers may be peeled off the color filter substrate during subsequent rubbing processes. As a result, not only alignment liquid is contaminated, but also a uniformity of the thickness of the liquid crystal layer is adversely affected, thereby reducing the image display quality of the display device.

SUMMARY

Embodiments of the present disclosure aim to provide a display substrate, a liquid crystal panel, a display device and a manufacturing method of the display substrate so as to eliminate the image-retention presented in the display device and increase a bonding strength of the spacers, thereby improving the display quality of the display device.

An embodiment of the present disclosure provides a display substrate comprising a plurality of pixel regions and grooves between adjacent pixel regions, wherein, the display substrate further comprises a spacer layer, the spacer layer comprising a filler filled into the grooves and a supporting part protruding from the filler.

In an example, the filler comprises a filler grid, and the supporting part is integrally formed with the filler.

Optionally, the display substrate comprises a color filter substrate comprising a base substrate, a black matrix layer, a color filter film layer and the spacer layer provided on the base substrate. In an example, the black matrix layer comprises a plurality of black matrix units, and gaps in a positional correspondence with the respective pixel regions are formed between adjacent black matrix units, and the color filter film layer comprises color filter units corresponding to respective gaps, and the grooves are located between adjacent color filter units.

In an example, the display substrate further comprises a transparent electrode layer which is disposed over the color filter film layer in regions where the pixel regions are located and which is disposed between the black matrix layer and the spacer layer in regions where the grooves are located.

Optionally, the supporting part is of a structure of a continuously supporting and connecting parapet on the filler.

Optionally, the supporting part is disposed in a peripheral non-display area of the display substrate.

An embodiment of the present disclosure may further provide a liquid crystal panel comprising the display substrate according to any one of the above embodiments or examples. The liquid crystal panel may be applied to a display device so that the image-retention presented in a displayed image may be improved and the display quality may be improved. Moreover, a uniformity in thickness of the liquid crystal layer in the liquid crystal panel is excellent so as to ensure the display quality further.

An embodiment of the present disclosure may further provide a display device comprising the liquid crystal panel described above.

An embodiment of the present disclosure may further provide a manufacturing method of a display substrate, comprising:

forming a spacer layer, which comprises a filler filled into grooves between adjacent pixel regions and a supporting part protruding from the filler, through a patterning process.

In an example, the display substrate is a color filter substrate, and the manufacturing method comprises steps of:

forming a black matrix layer on a base substrate of the display substrate through a patterning process, the black matrix layer comprising a plurality of black matrix units, and gaps in a positional correspondence with pixel regions to be formed being formed between adjacent black matrix units;

forming a color filter film layer on the base substrate of the display substrate through a patterning process, the color filter film layer comprising color filter units corresponding to respective gaps, and the grooves being located between adjacent color filter units; and forming a spacer layer in the grooves through a patterning process, the spacer layer comprising a filler filled into the grooves and a supporting part protruding from the filler.

Optionally, the step of forming a spacer layer through a patterning process comprises a step of forming the spacer layer through a patterning process with a single-slit mask, the mask used in the patterning process with the single-slit mask comprising a light-transmitting slit in a region corresponding to the grooves and a light-transmitting portion in a region corresponding to the supporting part.

Through the patterning process with the single-slit mask, the formed filler grid may have a precise line width so as to further improve the manufacturing quality of the display substrate.

Optionally, a width of the light-transmitting slit ranges from 1 μm to 3 μm.

Optionally, the step of forming a spacer layer through a patterning process comprises a step of forming a spacer layer through a patterning process with a half-tone mask, the mask used in the patterning process with the half-tone mask comprising a semi-light-transmitting portion in regions corresponding to the grooves and a full-light-transmitting portion in a region corresponding to the supporting part.

Optionally, after forming the color filter film layer and before forming the spacer layer, the manufacturing method further comprises: forming a transparent electrode layer over the color filter film layer in positions where the pixel regions to be formed are located and over the black matrix layer in positions where the grooves are located.

LIST OF REFERENCE NUMERALS

10—pixel region; 11—groove; 12—spacer layer; 121—filler/filler grid; 122—supporting part; 13—base substrate; 14—black matrix layer; 141—black matrix unit; 15—color filter film layer; 151—color filter unit; 16—transparent electrode layer; 18—gap.

DETAINED DESCRIPTION OF PREFERRED EMBODIMENTS OF THE DISCLOSURE

Embodiments of the present disclosure provide a display substrate, a liquid crystal panel, a display device and a manufacturing method of the display substrate so as to eliminate the image-retention presented in the display device and increase a bonding strength of the spacers, thereby improving the display quality of the display device. The present disclosure will be described in further detail by way of embodiments in order to make objectives, technical solutions and advantages of the present disclosure more clear.

Figure 1:
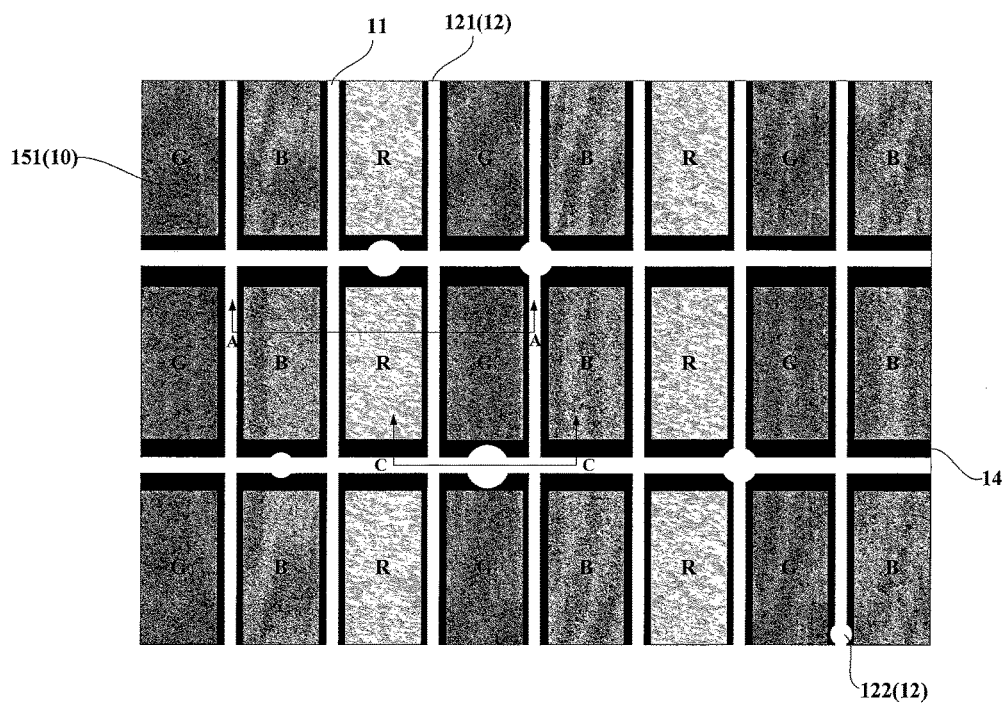
FIG. 1 is a partial top view of a display substrate according to an embodiment of the present disclosure.
Figure 2:
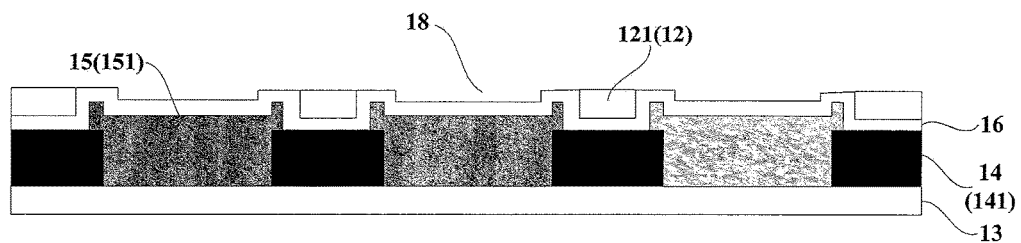
FIG. 2 is a sectional view of FIG. 1 taken along A-A line.
Figure 3:
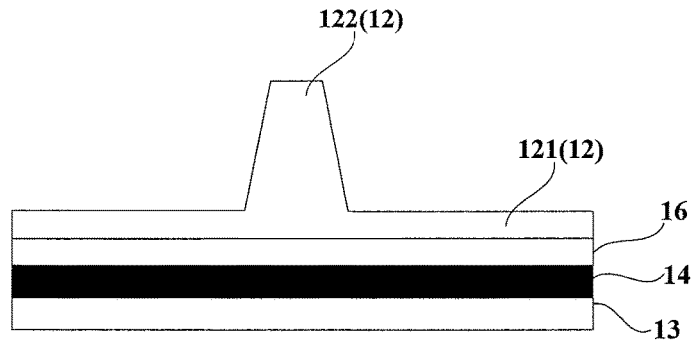
FIG. 3 is a sectional view of FIG. 1 taken along C-C line.

Referring to FIGS. 1-3, a display substrate according to an embodiment of the present disclosure may comprise a plurality of pixel regions 10. A groove 11 is formed between adjacent pixel regions 10. The display substrate may further comprise a spacer layer 12. The spacer layer 12 may comprise a filler 121 filled into the groove 11 and supporting parts 122 protruding from the filler 121. Optionally, the filler 121 is substantially flush with a surface of an adjacent pixel region. The filler 121 may be formed into a filler grid, and the supporting parts 122 may be integrally formed with the filler 121 or the filler grid 121.

In the display substrate according to the embodiment, it is not necessary to provide a planarization layer. With the structure of the embodiment, the filler grid 121 is filled into the groove between the adjacent pixel regions 10 so that the surface of the display substrate has a good flatness, so as to eliminate effectively the image-retention presented in the display device and improve the display quality of the display device. The supporting parts 122 may play a role of supporting as the existing spacers. Moreover, as the supporting parts 122 are integrally formed with the filler grid 121 so as to form a bonding of high strength. In this way, the supporting parts 122 are not easy to be peeled off in the subsequent rubbing process so that the alignment liquid is not contaminated, which provides a guarantee for the manufacturing quality of the display device.

Specific types of the display substrate are not limited herein, for example, the display substrate may include a color filter substrate of a twisted nematic (abbreviated as TN) type, or a color filter substrate of a vertical alignment (abbreviated as VA) type without any planarization layers, etc.

As shown in FIGS. 2 and 3, for example, the display substrate is a color filter substrate of TN type. The display substrate comprises a base substrate 13, a black matrix layer 14 disposed on the base substrate 13, a color filter film layer 15, a transparent electrode layer 16 and a spacer layer 12. The black matrix layer 14 may comprise a plurality of black matrix units 141. Between adjacent black matrix units 141, a gap 18 corresponding to a position of a pixel region 10 is formed. The color filter film layer 15 may comprise color filter units 151, which are disposed corresponding to the respective gaps. Between adjacent color filter units 151, grooves 11 are formed. The transparent electrode layer 16 is disposed over the color filter film layer 15 in positions where the pixel regions are located, and the transparent electrode layer 16 is disposed between the black matrix layer 14 and the spacer layer 12 in positions where the grooves are located.

With regard to the color filter substrate of other types, the spacer layer 12 may be directly formed over the black matrix layer in the grooves without the transparent electrode layer 16.

Moreover, it should be noted that the supporting parts 122 of the spacer layer 12 may be positioned not only between adjacent pixel regions 10 in a row direction but also between adjacent pixel regions 10 in a column direction.

Further, the supporting parts 122 may be of a structure of a continuously supporting and connecting parapet on the filler grid 121 so as to obtain a better support for the substrate. Also, the supporting parts 122 may better disposed in peripheral non-display areas of the display substrate so as to prevent the liquid crystal from being contaminated by a sealing adhesive, which may otherwise be caused by a rapid diffusion of the liquid crystal on the substrate when the upper and lower substrates of the display substrate are assembled.

An embodiment of the present disclosure may further provide a liquid crystal panel comprising the display substrate provided by the above embodiments. The liquid crystal panel may be applied to a display device so that the image-retention presented in a displayed image may be improved and the display quality may be improved. Moreover, a uniformity in thickness of the liquid crystal layer in the liquid crystal panel is excellent so as to ensure the display quality further.

An embodiment of the present disclosure may further provide a display device comprising the crystal liquid panel provided by the above embodiments. In the display device, the image-retention presented in a displayed image may be improved and the display quality may be improved. Specific types of the display device are not limited herein, for example, the display device may include a liquid crystal display, a liquid crystal television, a tablet computer, a cellphone and the like.

An embodiment of the present disclosure may further provide a manufacturing method of the display substrate. The manufacturing method may comprise a step of forming a spacer layer, which may comprise a filler grid filled into the grooves between adjacent pixel regions and a supporting part protruding from the filler grid, through a patterning process.

Figure 4:
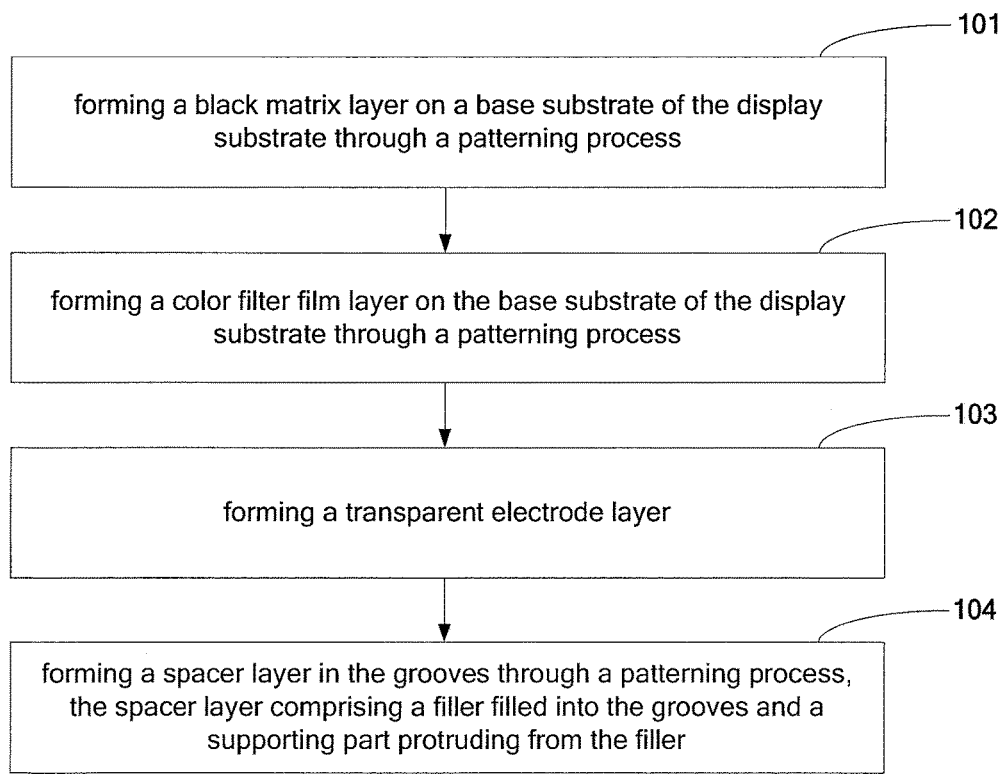
FIG. 4 is a flow chart of a manufacturing method of the display substrate according to an embodiment of the present disclosure.

In an example, as shown in FIG. 4, the display substrate is a color filter substrate, and the manufacturing method may comprise the following steps.

In a step S101, a black matrix layer is formed on a base substrate of the display substrate through a patterning process. The black matrix layer may comprise a plurality of black matrix units. Between adjacent black matrix units, gaps in a positional correspondence with pixel regions to be formed are formed.

In a step S102, a color filter film layer is formed on the base substrate of the display substrate through a patterning process. The color filter film layer may comprise color filter units corresponding to respective gaps. Grooves are formed between adjacent color filter units.

Specifically, when the color filter units of the substrate include red (R), green (G), and blue (B) color filter units, it is possible to firstly form patterns of the red color filter units on the substrate with a mask matching with the patterns of the red color filter units, secondly form patterns of the green color filter units on the substrate with a mask matching with the patterns of the green color filter units, and thirdly form patterns of the blue color filter units on the substrate with a mask matching with the patterns of the blue color filter units. The sequence of steps for forming the color filter units described above may also be interchangeable.

In a step S103, a transparent electrode layer is formed over the color filter film layer in positions where the pixel regions to be formed are located and formed over the black matrix layer in positions where the grooves are located. The transparent electrode layer may be formed, for example, by a sputtering process.

In a step S104, a spacer layer is formed in the grooves through a patterning process. The spacer layer may comprise a filler filled into the grooves and a supporting part protruding from the filler.

In an example, the step S103 is optional.

Optionally, the step S104 may comprise a step of forming a spacer layer through a patterning process with a single-slit mask. The mask used in the patterning process with the single-slit mask may include a light-transmitting slit in a region corresponding to the groove and a light-transmitting portion in a region corresponding to the supporting part.

Optionally, the light-transmitting slit may have a width of 1~3 μm. The mask used in the patterning process with the single-slit mask may include a light-transmitting slit in a region corresponding to the groove and a light-transmitting portion in a region corresponding to the supporting part. In this way, during the substrate is exposed, regions of the substrate where the filler grid to be formed is located are exposed through a slit diffraction of light and a pattern of the filler grid is formed after a development process. A shape of the light-transmitting portion of the mask matches with a shape of the supporting part, for example, may include a circular shape, a square shape or the like. Through the patterning process with the single-slit mask, the formed filler grid may have a precise line width so as to further improve the manufacturing quality of the display substrate.

Alternatively, the step S104 may comprise a step of forming a spacer layer through a patterning process with a half-tone mask. The mask used in the patterning process with the half-tone mask may include a semi-light-transmitting portion in a region corresponding to the groove and a full-light-transmitting portion in a region corresponding to the supporting part.

With the display substrate manufactured by the method according to the above embodiments of the present disclosure, the filler grid is filled into the groove between the adjacent pixel regions so that the surface of the display substrate has a good flatness, so as to eliminate effectively the image-retention presented in the display device and improve the display quality of the display device. The supporting parts may play a role of supporting as the existing spacers. Moreover, as the supporting parts are integrally formed with the filler grid so as to form a bonding of high strength. In this way, the supporting parts are not easy to be peeled off in the subsequent rubbing process so that the alignment liquid is not contaminated, which provides a guarantee for the manufacturing quality of the display device.

It will be apparent to those skilled in the art that various changes and modifications can be made to the present disclosure without departing from the spirit and scope of the present disclosure. In this way, the present disclosure is intended to include such modifications and variations if the modifications and variations of the present disclosure fall within the scope of the appended claims and equivalents thereof.

What is claimed is:

1. A display substrate comprising a plurality of pixel regions and grooves between adjacent pixel regions, wherein, the display substrate further comprises a spacer layer, the spacer layer comprising a filler filled into the grooves and a supporting part protruding from the filler;
   wherein, the filler comprises a filler grid, and the filler is substantially flush with a surface of an adjacent pixel region;
   wherein, the display substrate comprises a color filter substrate comprising a base substrate, a black matrix layer, a color filter film and the spacer layer provided on the base substrate;
   wherein, the black matrix layer comprises a plurality of black matrix units, and gaps in a positional correspondence with the respective pixel regions are formed between adjacent black matrix units; and
   wherein, the color filter film layer comprises color filter units corresponding to respective gaps, and the grooves are located between adjacent color filter units.

2. The display substrate according to claim 1, wherein, the supporting part is integrally formed with the filler.

3. The display substrate according to claim 2, wherein, the supporting part is of a structure of a continuously supporting and connecting parapet on the filler.

4. The display substrate according to claim 2, wherein, the supporting part is disposed in a peripheral non-display area of the display substrate.

5. The display substrate according to claim 1, wherein, the display substrate further comprises a transparent electrode layer which is disposed over the color filter film layer in regions where the pixel regions are located and which is disposed between the black matrix layer and the spacer layer in regions where the grooves are located.

6. The display substrate according to claim 5, wherein, the supporting part is of a structure of a continuously supporting and connecting parapet on the filler.

7. The display substrate according to claim 1, wherein, the supporting part is of a structure of a continuously supporting and connecting parapet on the filler.

8. The display substrate according to claim 1, wherein, the supporting part is disposed in a peripheral non-display area of the display substrate.

9. A liquid crystal panel comprising the display substrate according to claim 1.

10. A display device comprising the liquid crystal panel according to claim 9.

11. A manufacturing method of a display substrate, comprising:
forming a spacer layer, which comprises a filler filled into grooves between adjacent pixel regions and a supporting part protruding from the filler, through a patterning process,
wherein, the filler comprises a filler grid, and the filler is substantially flush with a surface of an adjacent pixel region,
wherein, the display substrate is a color filter substrate, and the manufacturing method comprises steps of:
forming a black matrix layer on a base substrate of the display substrate through a patterning process, the black matrix layer comprising a plurality of black matrix units, and gaps in a positional correspondence with pixel regions to be formed being formed between adjacent black matrix units;
forming a color filter film layer on the base substrate of the display substrate through a patterning process, the color filter film layer comprising color filter units corresponding to respective gaps, and the grooves being located between adjacent color filter units; and
forming a spacer layer in the grooves through a patterning process, the spacer layer comprising a filler filled into the grooves and a supporting part protruding from the filler.

12. The manufacturing method according to claim 11, wherein, the supporting part is integrally formed with the filler.

13. The manufacturing method according to claim 11, wherein, the step of forming a spacer layer through a patterning process comprises a step of forming the spacer layer through a patterning process with a single-slit mask, the mask used in the patterning process with the single-slit mask comprising a light-transmitting slit in a region corresponding to the grooves and a light-transmitting portion in a region corresponding to the supporting part.

14. The manufacturing method according to claim 13, wherein, a width of the light-transmitting slit ranges from 1 μm to 3 μm.

15. The manufacturing method according to claim 11, wherein, the step of forming a spacer layer through a patterning process comprises a step of forming a spacer layer through a patterning process with a half-tone mask, the mask used in the patterning process with the half-tone mask comprising a semi-light-transmitting portion in regions corresponding to the grooves and a full-light-transmitting portion in a region corresponding to the supporting part.

16. The manufacturing method according to claim 11, wherein, after forming the color filter film layer and before forming the spacer layer, the manufacturing method further comprises: forming a transparent electrode layer over the color filter film layer in positions where the pixel regions to be formed are located and over the black matrix layer in positions where the grooves are located.

\* \* \* \* \*